(12) United States Patent
Ramachandra et al.

(10) Patent No.: US 10,901,494 B2
(45) Date of Patent: Jan. 26, 2021

(54) METHOD AND A SYSTEM FOR PROVIDING GESTURE-BASED INTERACTION WITH A VIRTUAL PRODUCT

(71) Applicant: Wipro Limited, Bangalore (IN)

(72) Inventors: Manjunath Ramachandra, Bangalore (IN); Jijith Nadumuri Ravi, Bangalore (IN)

(73) Assignee: Wipro Limited, Bangalore (IN)

(*) Notice: Subject to any disclaimer, the term of this patent is extended or adjusted under 35 U.S.C. 154(b) by 297 days.

(21) Appl. No.: 15/471,567

(22) Filed: Mar. 28, 2017

(65) Prior Publication Data
US 2018/0284900 A1  Oct. 4, 2018

(51) Int. Cl.
G06F 3/01 (2006.01)
G06Q 30/06 (2012.01)
G06F 3/03 (2006.01)

(52) U.S. Cl.
CPC ............ G06F 3/011 (2013.01); G06F 3/017 (2013.01); G06F 3/0304 (2013.01); G06Q 30/0643 (2013.01)

(58) Field of Classification Search
CPC .... G06F 3/017; G06F 3/0304; G06Q 30/0643
See application file for complete search history.

(56) References Cited

U.S. PATENT DOCUMENTS

| | | |
|---|---|---|
| 2005/0261980 A1 | 11/2005 | Hadi |
| 2010/0240454 A1 | 9/2010 | Xiao |
| 2010/0241998 A1* | 9/2010 | Latta .................. G06F 3/011 715/862 |
| 2013/0331964 A1 | 12/2013 | Huang |
| 2014/0058812 A1 | 2/2014 | Bender et al. |
| 2015/0078621 A1 | 3/2015 | Choi et al. |
| 2015/0199025 A1 | 7/2015 | Holz |
| 2017/0132841 A1* | 5/2017 | Morrison ............. G06T 19/006 |
| 2019/0080176 A1* | 3/2019 | Lan .................... G06K 9/00335 |

FOREIGN PATENT DOCUMENTS

| | | | | |
|---|---|---|---|---|
| CN | 107273782 A | * | 10/2017 | ......... G06K 9/00335 |
| WO | WO-2017176511 A1 | * | 10/2017 | ......... G06K 9/00335 |

* cited by examiner

*Primary Examiner* — Justin R. Blaufeld
(74) *Attorney, Agent, or Firm* — Finnegan, Henderson, Farabow, Garrett & Dunner, LLP

(57) ABSTRACT

This technology relates to virtual assistance including a method and system for providing gesture-based interaction with a virtual product from a remote location. A virtual assistance system identifies in real-time, direct or personified user actions performed by a user on the virtual product from images and videos. Further, user actions are mapped with predefined user actions related to virtual product to determine values associated with predefined qualifiers and predefined consequences associated with the mapped predefined user actions. Furthermore, pre-stored images and pre-stored videos corresponding to the mapped predefined user actions, values associated with the predefined qualifiers and the predefined consequences, and detected active objects are extracted. The pre-stored images and the pre-stored videos are interpolated to generate a video sequence and displayed to the user to emulates the user actions in real-time such that user can experience and sense level of comfort and ease of handling the virtual product.

14 Claims, 4 Drawing Sheets

METHOD AND A SYSTEM FOR PROVIDING GESTURE-BASED INTERACTION WITH A VIRTUAL PRODUCT

FIELD

The present subject matter relates generally to virtual assistance, and more particularly, but not exclusively to a method and a system for providing gesture-based interaction with a virtual product.

BACKGROUND

Nowadays, online shopping/marketing has become very popular due to flexibility involved in selecting products of various brands, sizes, colours and the like. Also, online shopping/marketing allows a user to compare price of various products and select the product of his/her choice. In spite of advantages associated with online shopping/marketing, there exists people who do not opt online shopping/marketing due to a gap that the user feels in his/her purchase experience. As an example, the user may not be aware of his/her shoe size with respect to a certain brand and would be reluctant to buy the shoe online. Further, as an example, in spite of checking various reviews related to different brands of a refrigerator, the user may be confused regarding the brand of refrigerator to purchase online since he may not be able to sense and check all features of the refrigerator as performed while shopping in a showroom. Due to advancement in technology, it is possible to capture vision or look of the products accurately. As an example, the user may be provided with various options which enable him to check whether the product is placed in a dark, an illuminated room or under natural light, how a particular garment would look for a particular body shape and the like. However, a majority of users still remain unsatisfied as most of them are unable to proportionately scale length, shape, size or weight of the product.

Existing techniques enable the user to sense the product via haptic communication using means such as hand gloves. However, the user may not always have access to the hand gloves while shopping/marketing online. Further, the existing techniques using the haptic communication do not provide the actual feel such as level of comfort when a particular apparel or footwear is worn, ease of handling the product and the like. As an example, the level of comfort when a particular apparel or footwear is worn may be analysed based on parameters such as tightness of an apparel or a footwear, weight of the apparel or the footwear and the like. Further, as an example, ease of handling the product may be analysed based on parameters such as force needed to operate a part of the product, rigidity, durability of the product and the like.

Few other techniques provide information related to the product using pre-stored images, pre-stored videos. These techniques may also provide multiple views of the product as the user turns in different angles. However, these techniques are unable to provide the actual feel of the product related to handling the product, level of comfort involved in using/wearing the product/apparel and the like.

SUMMARY

One or more shortcomings of the prior art may be overcome and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method for providing gesture-based interaction with a virtual product. The method comprises identifying in real-time, by a virtual assistance system, one or more user actions performed by a user on the virtual product from at least one of one or more images and one or more videos received from an image capturing device associated with the virtual assistance system. Further, the virtual assistance system maps each of the one or more user actions with one or more predefined user actions related to the virtual product. Upon mapping, the virtual assistance system determines values associated with one or more predefined qualifiers and one or more predefined consequences associated with the mapped one or more predefined user actions by analyzing at least one of the one or more images and the one or more videos. Further, the virtual assistance system detects active objects related to the virtual product based on the values associated with the one or more predefined qualifiers and the one or more predefined consequences. Furthermore, the virtual assistance system extracts plurality of pre-stored images and plurality of pre-stored videos corresponding to the mapped one or more predefined user actions, values associated with the one or more predefined qualifiers and the one or more predefined consequences, and the active objects. Further, the virtual assistance system interpolates the plurality of pre-stored images and the plurality of pre-stored videos as per requirement based on the mapped one or more predefined user actions in real-time to generate a video sequence. Finally, the virtual assistance system displays the video sequence to the user, thereby providing interaction with the virtual product.

Further, the present disclosure includes a virtual assistance system for providing gesture-based interaction with a virtual product. The virtual assistance system comprises a processor and a memory communicatively coupled to the processor. The memory stores the processor-executable instructions, which, on execution, causes the processor to identify in real-time, one or more user actions performed by a user on the virtual product from at least one of one or more images and one or more videos received from an image capturing device associated with the virtual assistance system. Further, the processor maps each of the one or more user actions with one or more predefined user actions related to the virtual product. Upon mapping, the processor determines values associated with one or more predefined qualifiers and one or more predefined consequences associated with the mapped one or more predefined user actions by analyzing at least one of the one or more images and the one or more videos. Further, the processor detects active objects related to the virtual product based on the values associated with the one or more predefined qualifiers and the one or more predefined consequences. Furthermore, the processor extracts plurality of pre-stored images and plurality of pre-stored videos corresponding to the mapped one or more predefined user actions, values associated with the one or more predefined qualifiers and the one or more predefined consequences, and the active objects. Further, the processor interpolates the plurality of pre-stored images and the plurality of pre-stored videos as per requirement based on the mapped one or more predefined user actions in real-time to generate a video sequence. Finally, the processor display the video sequence to the user, thereby providing interaction with the virtual product.

Furthermore, the present disclosure includes a non-transitory computer readable medium including instructions stored thereon that when processed by at least one processor cause a virtual assistance system to provide gesture-based interaction with a virtual product by performing operations comprising identifying in real-time, one or more user actions performed by a user on the virtual product from at least one of one or more images and one or more videos received from an image capturing device associated with the virtual assistance system. Upon identifying, the instructions cause the processor to map each of the one or more user actions with one or more predefined user actions related to the virtual product. Further, the instructions cause the processor to determine values associated with one or more predefined qualifiers and one or more predefined consequences associated with the mapped one or more predefined user actions by analyzing at least one of the one or more images and the one or more videos. Furthermore, the instructions cause the processor to detect active objects related to the virtual product based on the values associated with the one or more predefined qualifiers and the one or more predefined consequences. Upon detecting the active objects, the instructions cause the processor to extract plurality of pre-stored images and plurality of pre-stored videos corresponding to the mapped one or more predefined user actions, values associated with the one or more predefined qualifiers and the one or more predefined consequences, and the active objects. Further, the instructions cause the processor to interpolate the plurality of pre-stored images and the plurality of pre-stored videos as per requirement based on the mapped one or more predefined user actions in real-time to generate a video sequence. Finally, the instructions cause the processor to displaying the video sequence to the user, thereby providing interaction with the virtual product.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
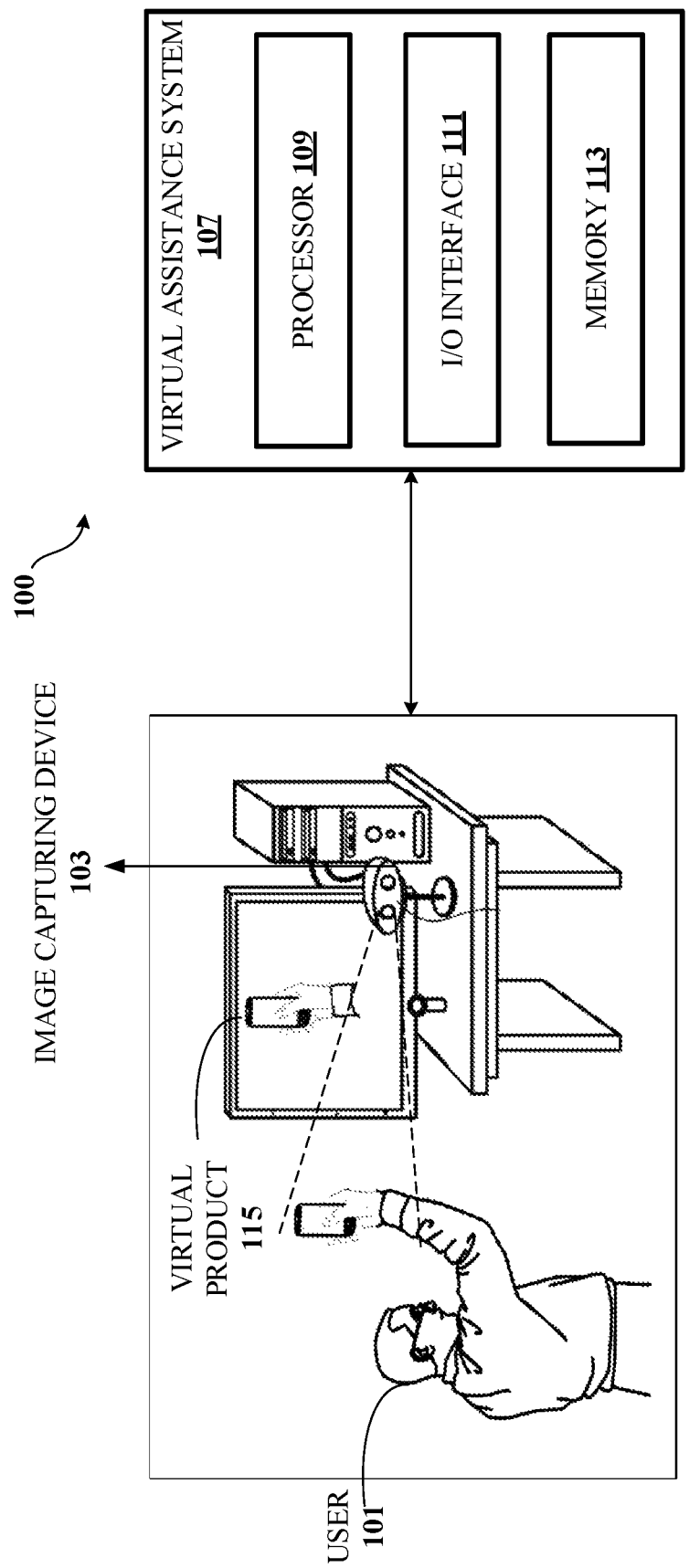
FIG. 1 shows an exemplary environment illustrating process for providing gesture-based interaction with a virtual product in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and system for providing gesture-based interaction with a virtual product. The present disclosure provides a feature that may emulate user actions on the virtual product in real-time such that an illusion is created that the user is operating the virtual product. Therefore, the user can experience and sense the level of comfort, ease of handling the virtual product, rigidity and the like. The method includes identifying in real-time, by a virtual assistance system, one or more user actions performed by a user on the virtual product from at least one of one or more images and one or more videos received from an image capturing device associated with the virtual assistance system. As an example, the one or more user actions may be performed on a virtual product selected by the user. Further, the user can perform direct user actions and personified user actions on the virtual product. The personified user action includes the user performing the user actions on a dummy object which is structurally similar to the virtual product. Further, the virtual assistance system may map each of the one or more user actions with one or more predefined user actions related to the virtual product. Upon mapping, the virtual assistance system may determine values associated with one or more predefined qualifiers and one or more predefined consequences associated with the mapped one or more predefined user actions by analyzing at least one of the one or more images and the one or more videos. Further, the virtual assistance system may detect active objects related to the virtual product based on the values associated with the one or more predefined qualifiers and the one or more predefined consequences. Furthermore, the virtual assistance system may extract plurality of pre-stored images and plurality of pre-stored videos corresponding to the mapped one or more predefined user actions, values associated with the one or more predefined qualifiers and the one or more predefined consequences, and the active objects. Further, the virtual assistance system may interpolate the plurality of pre-stored images and the plurality of pre-stored videos as per requirement based on the mapped one or more predefined user actions in real-time to generate a video sequence. Finally, the virtual assistance system may display the video sequence to the user, thereby providing interaction with the virtual product. The present disclosure provides a feature to apply certain settings on a virtual product from a remote location. Further, the user can visualize consequences of the applied settings on the virtual product such that the user is aware of occurring consequences when the virtual product is mishandled in reality.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for providing gesture-based interaction with a virtual product in accordance with some embodiments of the present disclosure.

The environment 100 includes a user 101, an image capturing device 103 and a virtual assistance system 107. As an example, the user 101 may be a customer, a consumer, a retailer and the like. The user 101 may use the image capturing device 103 associated with the virtual assistance system 107 to capture at least one of one or more images and one or more videos related to one or more user actions performed by the user 101. As an example, the image capturing device 103 may include, but not limited to, a camera, a mobile, a tablet and the like. As an example, the one or more user actions may be performed on a virtual product 115 (hereinafter, virtual product) selected by the user 101. As an example, the virtual product may be an apparel, a device, a machine, footwear and the like. In some embodiments, the virtual assistance system 107 may provide a notification to the user 101 to adjust position of the image capturing device 103 based on the virtual product selected by the user 101 prior to capturing at least one of the one or more images and the one or more videos. As an example, if the virtual product selected by the user 101 is related footwear, the virtual assistance system 107 may provide the notification to the user 101 such that feet of the user 101 are clearly visible and covered within field of view of the image capturing device 103. Further, in some embodiments, actual size of the user 101 may be computed by the virtual assistance system 107 based on depth of the image capturing device 103 i.e. distance of the user 101 from the image capturing device 103. In some embodiments, the image capturing device 103 may be connected to a computing device that the user 101 may be using to select the virtual product, analyze the virtual product, purchase the virtual product and the like. The image capturing device 103 may interact with the virtual assistance system 107 via a communication network (not shown in the FIG. 1). The communication network may be at least one of a wired communication network and a wireless communication network.

In some embodiments, the virtual assistance system 107 may be integrated with existing online shopping portals, marketing websites, advertisement portals and the like.

The virtual assistance system 107 includes a processor 109, an Input/Output (I/O) interface 111 and a memory 113. The I/O interface 111 may receive at least one of the one or more images and the one or more videos from the image capturing device 103. Upon receiving the at least one of one or more images and one or more videos, the processor 109 may identify the one or more user actions performed by the user 101 on the virtual product from the at least one of one or more images and one or more videos. As an example, if the virtual product is a mixer, the one or more user actions for the virtual product "mixer" may include, but not limited to, turning knob of the mixer, opening lid of a container placed on the mixer, closing lid of the container placed on the mixer and the like. In some embodiments, the processor 109 may provide recommendations to the user 101 regarding the one or more user actions that could be performed on the virtual product. As an example, the recommendations may be displayed in the form of a menu to the user 101. In some embodiments, the one or more user actions may include, but not limited to, direct user actions and personified user actions. In some embodiments, the direct user actions may be the one or more user actions performed by the user 101 on the virtual product by imagining shape and structure of the virtual product. In some embodiments, the personified user actions may be the one or more user actions performed by the user 101 using one or more predefined objects that are structurally similar to the virtual product selected by the user 101. As an example, if the virtual product is a pen, the one or more predefined objects that are structurally similar to the pen may be a stick, a pencil and the like. Further, as an example, if the virtual product is car steering, the one or more predefined objects that are structurally similar to the car steering may be a hula loop. Further, the processor 109 may map each of the one or more user actions with one or more predefined user actions related to the virtual product. Furthermore, the processor 109 may determine values associated with one or more predefined qualifiers and one or more predefined consequences associated with the mapped one or more predefined user actions by analyzing at least one of the one or more images and the one or more videos. In some embodiments, the one or more predefined qualifiers and the one or more predefined consequences are specific to the virtual product and brand of the virtual product. Below given Table 1 shows exemplary predefined user actions, predefined qualifiers and predefined consequences for an exemplary virtual product of a particular brand. Consider the exemplary virtual product is a mixer and a component of the mixer considered is a knob.

TABLE 1

| Component | Predefined user actions | Predefined qualifiers | Predefined consequences |
|---|---|---|---|
| knob | Turn the knob clockwise | Force applied | Increased speed by 20% |
| | | Degree of the turn | Grinding (20% less time required) |
| | Turn the knob anticlockwise | Force applied | Decreased speed by 20% |
| | | Degree of the turn | Slower grinding (20% more time required) |
| | Turn the knob many times at a stretch | Force applied | Knob may get damaged if the force applied is greater than a predefined threshold |

TABLE 1-continued

| Component | Predefined user actions | Predefined qualifiers | Predefined consequences |
|---|---|---|---|
| | | | specific to brand of the mixer |
| | | Number of times the knob was turned | Knob may get damaged if the force applied is greater than a predefined threshold specific to brand of the mixer |

Further, the processor 109 may detect active objects related to the virtual product based on the values associated with the one or more predefined qualifiers and the one or more predefined consequences. As an example, if the virtual product is a mixer, the active objects may be content in a mixer jar of the mixer. Furthermore, the processor 109 may extract plurality of pre-stored images and plurality of pre-stored videos corresponding to the mapped one or more predefined user actions, values associated with the one or more predefined qualifiers and the one or more predefined consequences, and the active objects. In some embodiments, the plurality of pre-stored images and plurality of pre-stored videos may be extracted from the memory 113 or an external repository associated with the virtual assistance system 107. In some embodiments, the plurality of pre-stored images and the plurality of pre-stored videos are specific to the virtual product and a brand of the virtual product. Upon extracting the plurality of pre-stored images and plurality of pre-stored videos, the processor 109 may interpolate the plurality of pre-stored images and the plurality of pre-stored videos as per requirement based on the mapped one or more predefined user actions in real-time to generate a video sequence. The generated video sequence may be displayed to the user 101 on the computing device, thereby providing interaction with the virtual product. The generated video sequence emulates and implements the one or more user actions on the virtual product in real-time.

Figure 2:
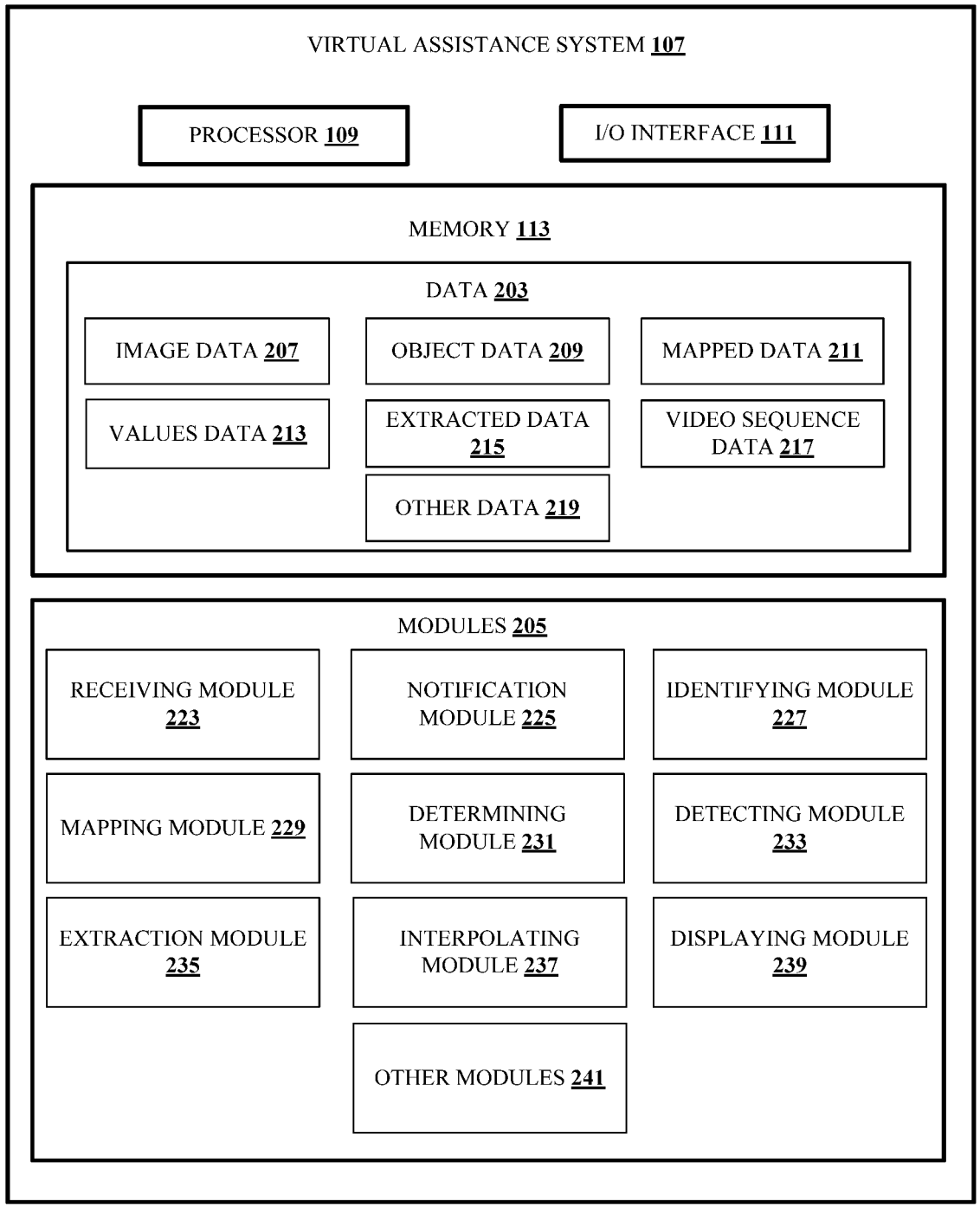
FIG. 2 shows a detailed block diagram of a virtual assistance system for providing gesture-based interaction with a virtual product in accordance with some embodiments of the present disclosure.

FIG. 2 shows a detailed block diagram of the virtual assistance system for providing gesture-based interaction with a virtual product in accordance with some embodiments of the present disclosure.

In some implementations, the virtual assistance system 107 may include data 203 and modules 205. As an example, the data 203 is stored in the memory 113 configured in the virtual assistance system 107 as shown in the FIG. 2. In one embodiment, the data 203 may include an image data 207, object data 209, mapped data 211, values data 213, extracted data 215, video sequence data 217 and other data 219. In the illustrated FIG. 2, modules 205 are described herein in detail.

In some embodiments, the data 203 may be stored in the memory 113 in form of various data structures. Additionally, the data 203 can be organized using data models, such as relational or hierarchical data models. The other data 219 may store data, including temporary data and temporary files, generated by the modules 205 for performing the various functions of the virtual assistance system 107.

In some embodiments, the data stored in the memory 113 may be processed by the modules 205 of the virtual assistance system 107. The modules 205 may be stored within the memory 113. In an example, the modules 205 communicatively coupled to a processor 109 configured in the virtual assistance system 107, may also be present outside the memory 113 as shown in FIG. 2 and implemented as hardware. As used herein, the term modules refer to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 205 may include, for example, a receiving module 223, a notification module 225, an identifying module 227, a mapping module 229, a determining module 231, a detecting module 233, an extraction module 235, an interpolating module 237, a displaying module 239 and other modules 241. The other modules 241 may be used to perform various miscellaneous functionalities of the virtual assistance system 107. It will be appreciated that such aforementioned modules 205 may be represented as a single module or a combination of different modules.

In some embodiments, the receiving module 223 may receive at least one of one or more images and one or more videos from an image capturing device 103 associated with the virtual assistance system 107. The at least one of the one or more images and the one or more videos received from the image capturing device 103 may be stored as the image data 207. The at least one of the one or more images and the one or more videos may be related to one or more user actions performed by a user 101 on a virtual product selected by the user 101. As an example, the user 101 may be a customer, a consumer, a retailer and the like. As an example, the user 101 may select the virtual product for online shopping, comparing the virtual products of certain brands and the like. As an example, the virtual product may be an apparel, a device, a machine, footwear and the like. In some embodiments, the notification module 225 may notify the user 101 to adjust position of the image capturing device 103 based on the virtual product selected by the user 101 prior to capturing at least one of the one or more images and the one or more videos. The notification module 225 may provide notification by selecting a region of interest based on the virtual product. As an example, if the virtual product is footwear, the region of interest may be feet. Therefore, if the virtual product selected by the user 101 is related footwear, the virtual assistance system 107 may provide the notification to the user 101 such that feet of the user 101 are clearly visible and covered within field of view of the image capturing device 103.

In some embodiments, the identifying module 227 may identify the one or more user actions performed by the user 101 on the virtual product. Upon selecting the virtual product, the user 101 may perform the one or more actions to test or analyze various features of the virtual product. As an example, if the virtual product selected is a shoe, the one or more user actions may be wearing the shoe, removing the shoe, tying lace of the shoe, removing lace of the shoe, walking upon wearing the shoe and the like. As an example, if the virtual product is a device, the one or more user actions may include, but not limited to, applying certain settings on the device virtually and transporting the applied settings in the form of a file for his reference. The identifying module 227 may identify the one or more user actions from at least one of the one or more images and the one or more videos. In some embodiments, the one or more user actions may be converted into text format or into a set of features for identifying the one or more user actions. As an example, the conversion may be performed using predefined techniques such as Recurrent Neural Network (RNN). In some embodiments, the one or more user actions may include, but not limited to, direct user actions and personified user actions. In some embodiments, the direct user actions may be the one or more user actions performed by the user 101 on the virtual product by imagining shape and structure of the virtual product. As an example, if the virtual product is an apparel and the user 101 wants to wear the apparel to check if the size fits him properly or not, the user 101 may imagine the apparel and enact the user actions similar to that of wearing the apparel. In some embodiments, the personified user actions may be the one or more user actions performed by the user 101 using one or more predefined objects that are structurally similar to the virtual product selected by the user 101. In some embodiments, the one or more predefined objects may not be of same size as the virtual product. As an example, if the virtual product is a pen, the one or more predefined objects that are structurally similar to the pen may be a stick, a pencil and the like. In some embodiments, the one or more predefined objects for performing the personified user actions may be specific to each virtual object and are stored as object data 209. In some embodiments, if the user 101 uses a random object for performing the personified user actions which is not mentioned in the one or more predefined objects, the notification module 225 may notify the user 101 that an invalid object is selected. In some embodiments, consequences of one or more similar user actions may be interpreted differently based on the virtual product. As an example, if the virtual product is a mixer, when the user 101 virtually turns knob of the mixer, consequence of the user action may be interpreted as "increasing or decreasing speed of the mixer". As an example, if the virtual product is a screw driver, when the user 101 virtually turns the screw driver, the consequence of the user action may be interpreted as "moving screw inwards or outwards". Therefore, the identifying module 227 may identify user actions of the user 101 based on the virtual product.

In some embodiments, the mapping module 229 may map the one or more user actions with one or more predefined user actions related to the virtual product. Based on the mapping, one or more predefined qualifiers and one or more predefined consequences associated with the mapped one or more predefined user actions may be retrieved. In some embodiments, the one or more predefined qualifiers and the one or more predefined consequences are specific to the virtual product and a brand of the virtual product. As an example, if the user action associated with the virtual product "mixer" is "turning knob of a mixer", the one or more predefined qualifiers may be "force applied on the knob" and "degree of turn of the knob". Further, the one or more predefined consequences may be "increase in speed" and "grinding eatables in the mixer". The one or more mapped predefined user actions, the one or more predefined qualifiers and the one or more predefined consequences associated with the one or more mapped predefined user actions may be stored as the mapped data 211.

In some embodiments, the determining module 231 may determine values associated with the one or more predefined qualifiers and the one or more predefined consequences associated with the mapped one or more predefined user actions. The determining module 231 may determine the values associated with the one or more predefined qualifiers and the one or more predefined consequences by analyzing at least one of the one or more images and the one or more videos. The determined values associated with the one or more predefined qualifiers and the one or more predefined consequences may be stored as the values data 213. In some embodiments, analyzing at least one of the one or more images and the one or more videos may be based on one or more predefined attributes associated with the one or more predefined user actions of the virtual product. As an example, if the virtual product is a mixer and the user action is "turning knob of the mixer", the one or more predefined attributes may be "stiffness of finger muscles", "relative orientation of thumb and forefinger", "gap between forefinger and thumb" and "orientation of palm". Further, the determination module 231 may compare the determine values associated with the one or more predefined qualifiers and the one or more predefined consequences with a predefined threshold to arrive at various conclusions related to the virtual product corresponding to the user 101. As an example, consider the virtual product is a shoe. Further, consider a predefined qualifier associated with the shoe is "force applied to squeeze the foot inside the shoe". A value associated with the predefined qualifier "force applied to squeeze the foot inside the shoe" may be "X". If the value "X" is less than a predefined threshold force required to squeeze the foot inside the shoe "Y", the predefined consequence may be "foot 50% squeezed into the shoe". If the value "X" is more than the predefined threshold force required to squeeze the foot inside the shoe "Y", the predefined consequence may be "foot 100% squeezed into the shoe". If the value "X" is more than the predefined threshold force required to squeeze the foot inside the shoe "Y", but the predefined consequence may be "foot 50% squeezed into the shoe" since the size of the shoe is small for the user 101".

In some embodiments, the values associated with the one or more predefined qualifiers and the one or more predefined consequences may be determined by using haptics. The user 101 may use haptic gloves, haptic foot gloves and the like that include one or more sensors for determining the values.

In some embodiments, the detecting module 233 may detect active objects related to the virtual product based on the values associated with the one or more predefined qualifiers and the one or more predefined consequences. As an example, if the virtual product is a mixer, the active object may be content in a mixer jar. In some embodiments, state of the active object may change based on the one or more predefined consequences. As an example, if the active product i.e. content in the mixer jar is sugar crystals, the state of the active product may change from sugar crystals to sugar powder upon applying a certain predefined force on knob of the mixer for achieving a certain consequence. In some embodiments, the active objects for a given virtual product may be updated dynamically based on various scenarios i.e. based on various consequences of the one or more user actions.

In some embodiments, the extraction module 235 may extract plurality of pre-stored images and plurality of pre-stored videos corresponding to the mapped one or more predefined user actions, values associated with the one or more predefined qualifiers and the one or more predefined consequences, and the active objects. The extracted plurality of pre-stored images and plurality of pre-stored videos may be stored as the extracted data 215. In some embodiments, the plurality of pre-stored images and the plurality of pre-stored videos are specific to the virtual product and the brand of the virtual product. In some embodiments, the plurality of pre-stored images and the plurality of pre-stored images may be generated offline by capturing each action related to each component in the virtual product. As an example, if the virtual product is a pen, images and videos related to performing a certain action on different components of the pen are captured. As an example, the actions performed on the different components of the pen may be "opening cap", "closing cap", "refilling", "writing", "breaking nib" and the like. As an example, if the virtual product is a shoe, actions that are captured in images and videos may be user 101 trying to squeeze his foot into the shoe, foot completely fitted into the shoe and the like.

In some embodiments, the interpolating module 237 may interpolate the plurality of pre-stored images and the plurality of pre-stored videos as per requirement based on the mapped one or more predefined user actions in real-time to generate a video sequence. As an example, if the user 101 is trying to squeeze his foot into the shoe, the requirement may be an image or a video that may emulate a foot having same size as that of the user 101, the user action of squeezing foot into the shoe and the like. Therefore, the interpolating module 237 may select the appropriate plurality of pre-stored images and the plurality of pre-stored videos that satisfy the requirement and may generate the video sequence by interpolating the selected plurality of pre-stored images and the plurality of pre-stored videos. The generated video sequence may be stored as the video sequence data 217.

In some embodiments, the displaying module 239 may display the video sequence to the user 101. The displaying module 239 may display the video sequence such that the one or more user actions may get emulated and implemented on the virtual product in real-time.

Henceforth, the process for providing gesture-based interaction with a virtual product is explained with the help of one or more examples for better understanding of the present disclosure. However, the one or more examples should not be considered as limitation of the present disclosure.

Consider an exemplary scenario where the user 101 wants to buy a sandwich maker to roast bread of brand A. The user 101 may select a sandwich maker of brand x and brand y using a shopping website. However, the user 101 is not sure about which brand of the sandwich maker he should purchase. The user 101 may want to check if the sandwich maker can roast 2 bread pieces at a time when they are placed adjacent to each other with acceptable squeeze. Therefore, the user 101 may activate the virtual assistance system 107 to decide the brand of sandwich maker to purchase. The user 101 may draw the bread of brand A from a third party application and place it on the sandwich maker of brand x virtually. Upon placing the bread, the user 101 may perform a direct user action on the bread by enacting a squeezing action of the bread. The image capturing device 103 may capture the images and the video of the direct user action. By mapping the direct user action with predefined user actions associated with the virtual product "sandwich maker", the virtual assistance system 107 may identify the user action as squeezing the bread. Consider the predefined qualifier for the virtual product "sandwich maker" is force applied to squeeze the bread and a predefined threshold of force to be applied is "P". Based on analysis of the images and the video, the virtual assistance system 107 may determine value associated with the predefined qualifier as "F". Consider, the value "F" is equal to the predefined threshold "P". Therefore, the predefined consequence for the value associated with the predefined qualifier may be "100% squeezed into the sandwich maker". The active object is detected to be "bread" currently. The virtual assistance system 107 extracts plurality of pre-stored images and plurality of pre-stored videos corresponding to the mapped user action, value associated with the predefined qualifier and the predefined consequence, and the active object. Further, the virtual assistance system 107 generates a video sequence by interpolating the plurality of pre-stored images and plurality of pre-stored videos and displays the video sequence to the user 101 in real-time. The video sequence is displayed to the user 101 in such a way that, the user actions performed by the user 101 in front of the image capturing device 103 get accurately emulated on the virtual product in real-time. Therefore, the video sequence in this scenario may include the user action of squeezing the bread completely into the sandwich maker. The user 101 may perform the similar process on the sandwich maker of brand y and compares which brand is best for him.

Figure 3:
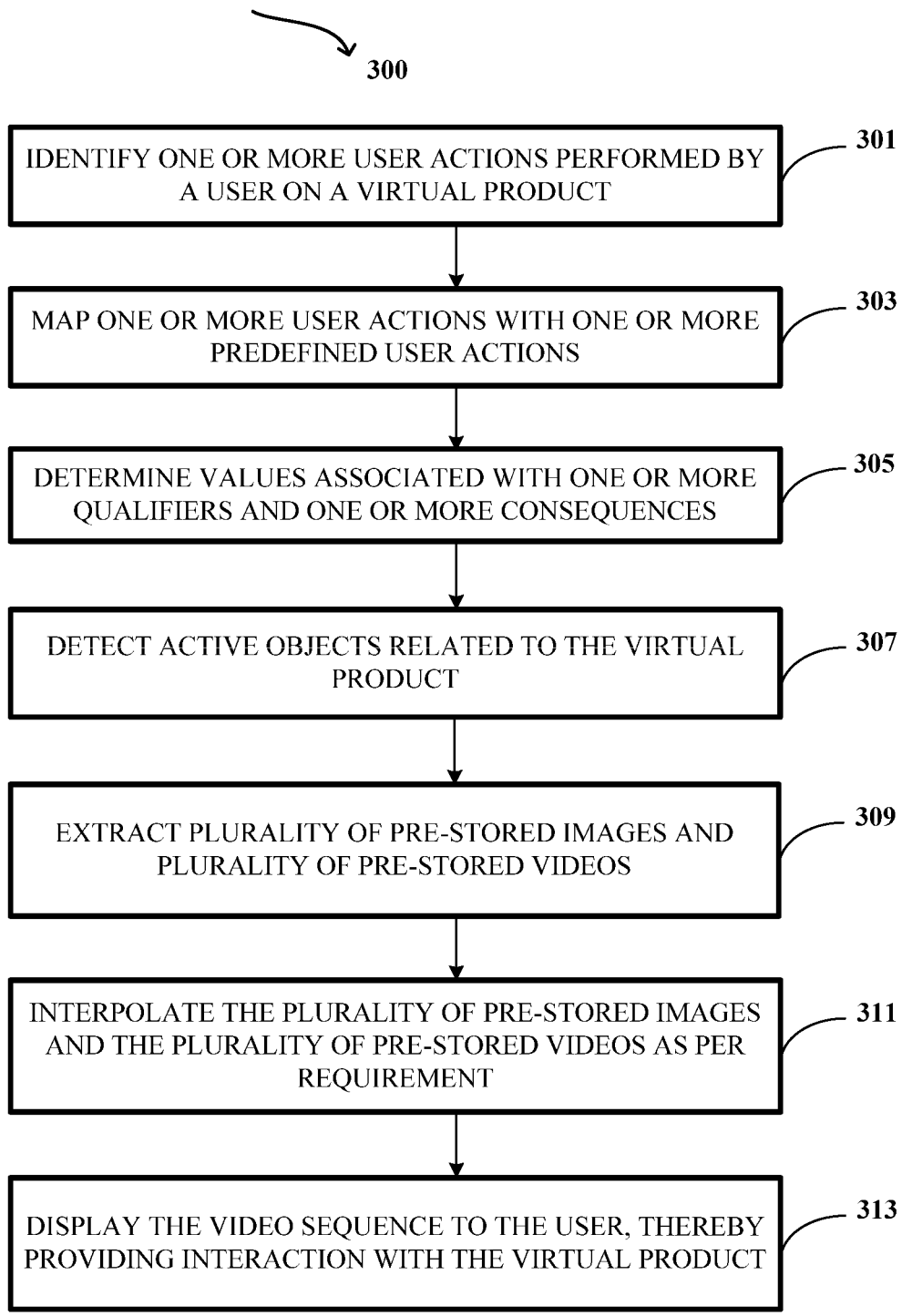
FIG. 3 shows a flowchart illustrating a method for providing gesture-based interaction with a virtual product in accordance with some embodiments of the present disclosure.

FIG. 3 shows a flowchart illustrating a for providing gesture-based interaction with a virtual product in accordance with some embodiments of the present disclosure.

As illustrated in FIG. 3, the method 300 includes one or more blocks illustrating a method for providing gesture-based interaction with a virtual product. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include identifying in real-time, by a processor 109 of the virtual assistance system 107, one or more user actions performed by a user 101 on the virtual product from at least one of one or more images and one or more videos received from an image capturing device 103 associated with the virtual assistance system 107. As an example, the one or more user actions may be performed by the user 101 on a virtual product selected by the user 101. As an example, the virtual product may be an apparel, a device, a machine, footwear and the like.

At block 303, the method 300 may include mapping, by the processor 109, each of the one or more user actions with one or more predefined user actions related to the virtual product. In some embodiments, the processor 109 may retrieve one or more predefined qualifiers and one or more predefined consequences associated with the mapped one or more predefined user actions based on the mapping. In some embodiments, the one or more predefined qualifiers and the one or more predefined consequences are specific to the virtual product and a brand of the virtual product.

At block 305, the method 300 may include, determining, by the processor 109, values associated with the one or more predefined qualifiers and the one or more predefined consequences associated with the mapped one or more predefined user actions by analyzing at least one of the one or more images and the one or more videos. In some embodiments, the processor 109 may analyses at least one of the one or more images and the one or more videos based on one or more predefined attributes associated with the virtual product. In some embodiments, the one or more predefined qualifiers and the one or more predefined consequences are specific to the virtual product and a brand of the virtual product.

At block 307, the method 300 may include, detecting, by the processor 109, active objects related to the virtual product based on the values associated with the one or more qualifiers and the one or more consequences. In some embodiments, state of the active object may change based on the one or more predefined consequences.

At block 309, the method 300 may include, extracting, by the processor 109, plurality of pre-stored images and plurality of pre-stored videos corresponding to the mapped one or more predefined user actions, values associated with the one or more predefined qualifiers and the one or more predefined consequences, and the active objects. In some embodiments, the plurality of pre-stored images and the plurality of pre-stored videos are specific to the virtual product and the brand of the virtual product.

At block 311, the method 300 may include, interpolating, by the processor 109, the plurality of pre-stored images and the plurality of pre-stored videos as per requirement based on the mapped one or more predefined user actions in real-time to generate a video sequence.

At block 313, the method 300 may include, displaying, by the processor 109, the generated video sequence to the user 101, thereby providing interaction with the virtual product. In some embodiments, displaying the video sequence comprises emulating and implementing the one or more user actions on the virtual product in real-time.

Figure 4:
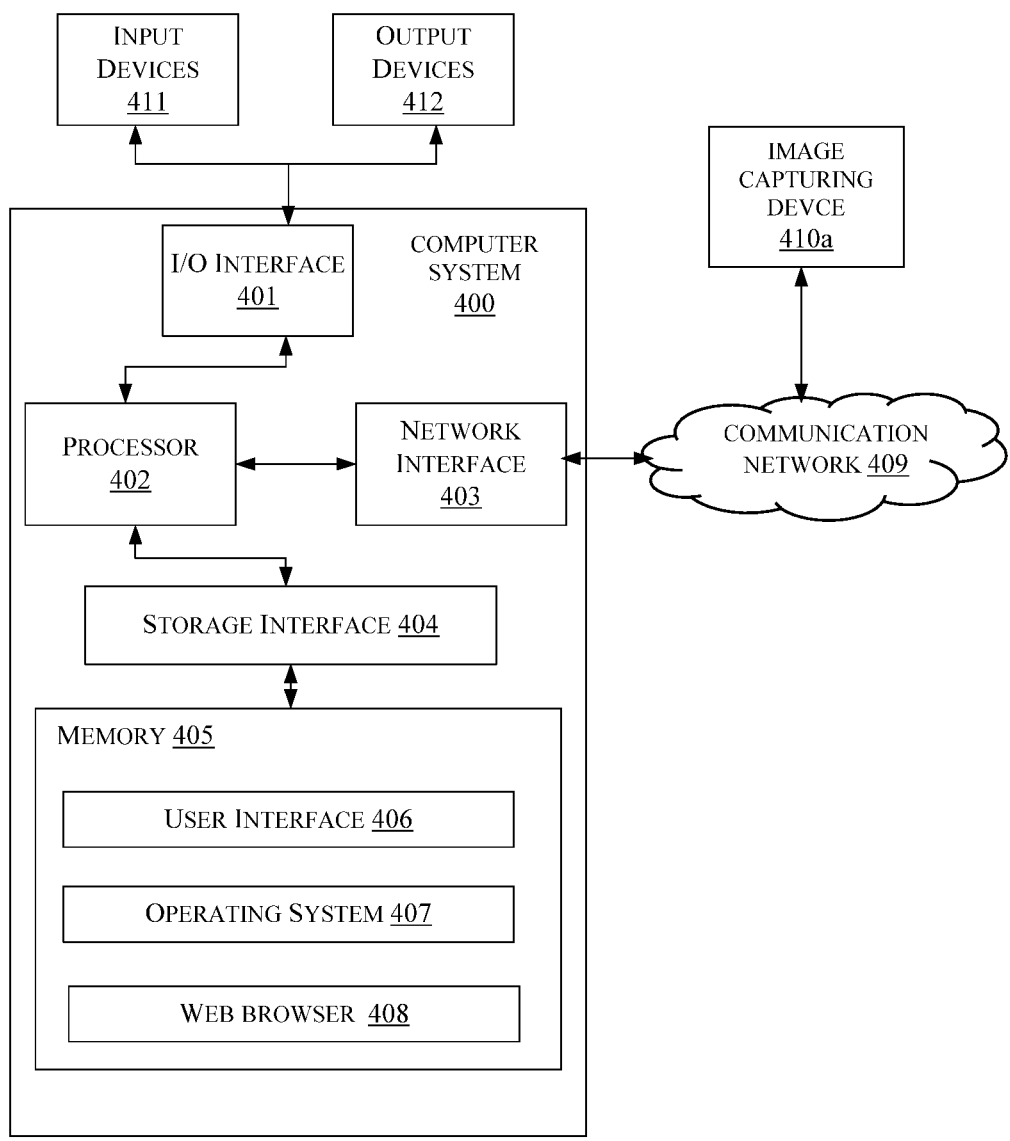
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, FIG. 4 illustrates a block diagram of an exemplary computer system 400 for implementing embodiments consistent with the present invention. In an embodiment, the computer system 400 can be virtual assistance system 107 that is used for providing gesture-based interaction with a virtual product. The computer system 400 may include a central processing unit ("CPU" or "processor") 402. The processor 402 may include at least one data processor for executing program components for executing user or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with an image capturing device 410a. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The image capturing device 410a may include, but not limited to, a camera, a mobile and a tablet.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 400 may implement the web browser 408 stored program components. The web browser 408 may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C #, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Examples of advantages of the embodiment of the present disclosure are illustrated herein.

In an embodiment, the present disclosure provides a method and a system for providing gesture-based interaction with a virtual product.

The present disclosure provides a feature wherein the user actions are emulated on the virtual product in real-time such that an illusion is created that the user is operating the virtual product.

The present disclosure provides a feature wherein a user can apply certain settings on a virtual product from a remote location. Further, the user can visualize consequences of the applied settings on the virtual product such that the user is aware of occurring consequences when the virtual product is mishandled in reality.

The present disclosure provides a feature wherein the user can perform personified user actions on the virtual product i.e. the user can use a dummy object which is structurally similar to the virtual product and perform the personified user actions on the dummy object. The personified user actions are emulated on to the virtual product in real-time.

The present disclosure provides a feature wherein the user can experience and sense the level of comfort, ease of handling the virtual product, rigidity and the like.

A description of an embodiment with several components in communication with each other does not imply that all such components are required. On the contrary a variety of optional components are described to illustrate the wide variety of possible embodiments of the invention.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for providing gesture-based interaction with a virtual product. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A method for providing gesture-based interaction with a virtual product, the method comprising:
   identifying in real-time, by a virtual assistance system, one or more user actions performed by a user on the virtual product from at least one of one or more images and one or more videos received from an image capturing device associated with the virtual assistance system, wherein the one or more user actions comprise personified user actions that comprise performing the one or more user actions using one or more predefined objects whose contours have a structural correspondence to the virtual product selected by the user, and wherein the one or more predefined objects are specific to the virtual product;
   mapping, by the virtual assistance system, each of the one or more user actions with one or more predefined user actions related to the virtual product;
   determining, by the virtual assistance system, values associated with one or more predefined qualifiers and one or more predefined consequences associated with the mapped one or more predefined user actions by analyzing at least one of the one or more images and the one or more videos, wherein each of the determined values are compared with a corresponding predefined threshold to determine one or more of the predefined consequences related to the virtual product corresponding to one of the determined values;

detecting, by the virtual assistance system, active objects related to the virtual product based on the values associated with the one or more predefined qualifiers and the one or more predefined consequences;

extracting, by the virtual assistance system, a plurality of pre-stored images and a plurality of pre-stored videos based on the mapped one or more predefined user actions, values associated with the one or more predefined qualifiers and the one or more predefined consequences, the active objects, and a state of the active objects, wherein the state of the active objects are dynamically updated based on the values associated with the one or more predefined qualifiers and the one or more predefined consequences;

interpolating, by the virtual assistance system, the extracted plurality of pre-stored images and the plurality of pre-stored videos based on the mapped one or more predefined user actions in real-time to generate a video sequence, wherein the interpolating further comprises a selection of at least one of the plurality of pre-stored images with at least one of the plurality of pre-stored videos to generate at least a portion of the video sequence; and displaying, by the virtual assistance system, the video sequence to the user, thereby providing interaction with the virtual product.

2. The method as claimed in claim 1, wherein the one or more user actions further comprise direct user actions.

3. The method as claimed in claim 1, wherein the one or more predefined qualifiers and the one or more predefined consequences are specific to the virtual product and a brand of the virtual product.

4. The method as claimed in claim 1, wherein the plurality of pre-stored images and the plurality of pre-stored videos are specific to the virtual product and a brand of the virtual product.

5. The method as claimed in claim 1, wherein displaying the video sequence comprises emulating and implementing the one or more user actions on the virtual product in real-time.

6. The method as claimed in claim 1 further comprising providing, by the virtual assistance system, notification to the user to adjust the position of the image capturing device based on the virtual product selected by the user prior to capturing at least one of the one or more images and the one or more videos.

7. The method of claim 1, further comprising notifying the user when an object used by the user for performing the personified user actions is not one of the one or more predefined objects.

8. A virtual assistance system for providing gesture-based interaction with a virtual product, the virtual assistance system comprising:

a processor; and a memory communicatively coupled to the processor, wherein the memory stores processor-executable instructions, which, on execution, causes the processor to:

identify in real-time, one or more user actions performed by a user on the virtual product from at least one of one or more images and one or more videos received from an image capturing device associated with the virtual assistance system, wherein the one or more user actions comprise personified user actions that comprise performing the one or more user actions using one or more predefined objects whose contours have a structural correspondence to the virtual product selected by the user, and wherein the one or more predefined objects are specific to the virtual product;

map each of the one or more user actions with one or more predefined user actions related to the virtual product;

determine values associated with one or more predefined qualifiers and one or more predefined consequences associated with the mapped one or more predefined user actions by analyzing at least one of the one or more images and the one or more videos, wherein each of the determined values are compared with a corresponding predefined threshold to determine one or more of the predefined consequences related to the virtual product corresponding to one of the determined values;

detect active objects related to the virtual product based on the values associated with the one or more predefined qualifiers and the one or more predefined consequences;

extract a plurality of pre-stored images and a plurality of pre-stored videos based on the mapped one or more predefined user actions, values associated with the one or more predefined qualifiers and the one or more predefined consequences, the active objects, and a state of the active objects, wherein the state of the active objects are dynamically updated based on the values associated with the one or more predefined qualifiers and the one or more predefined consequences;

interpolate the extracted plurality of pre-stored images and the plurality of pre-stored videos based on the mapped one or more predefined user actions in real-time to generate a video sequence, wherein the interpolating further comprises a selection of at least one of the plurality of pre-stored images with at least one of the plurality of pre-stored videos to generate at least a portion of the video sequence; and display the video sequence to the user, thereby providing interaction with the virtual product.

9. The virtual assistance system as claimed in claim 8, wherein the one or more user actions further direct user actions.

10. The virtual assistance system as claimed in claim 8, wherein the one or more predefined qualifiers and the one or more predefined consequences are specific to the virtual product and a brand of the virtual product.

11. The virtual assistance system as claimed in claim 8, wherein the plurality of pre-stored images and the plurality of pre-stored videos are specific to the virtual product and a brand of the virtual product.

12. The virtual assistance system as claimed in claim 8, wherein to display the video sequence, the processor-executable instructions cause the processor to emulate and implement the one or more user actions on the virtual product in real-time.

13. The virtual assistance system as claimed in claim 8, wherein the processor is further configured to provide notification to the user to adjust the position of the image capturing device based on the virtual product selected by the user prior to capturing at least one of the one or more images and the one or more videos.

14. A non-transitory computer readable medium including instructions stored thereon that when processed by at least one processor cause a virtual assistance system to provide gesture-based interaction with a virtual product by performing operations comprising:

identifying in real-time, one or more user actions performed by a user on the virtual product from at least one of one or more images and one or more videos received from an image capturing device associated with the virtual assistance system, wherein the one or more user actions comprise personified user actions that comprise performing the one or more user actions using one or more predefined objects whose contours have a structural correspondence to the virtual product selected by the user, and wherein the one or more predefined objects are specific to the virtual product;

mapping each of the one or more user actions with one or more predefined user actions related to the virtual product;

determining values associated with one or more predefined qualifiers and one or more predefined consequences associated with the mapped one or more predefined user actions by analyzing at least one of the one or more images and the one or more videos, wherein each of the determined values are compared with a corresponding predefined threshold to determine one or more of the predefined consequences related to the virtual product corresponding to one of the determined values;

detecting active objects related to the virtual product based on the values associated with the one or more predefined qualifiers and the one or more predefined consequences;

extracting a plurality of pre-stored images and a plurality of pre-stored videos based on the mapped one or more predefined user actions, values associated with the one or more predefined qualifiers and the one or more predefined consequences, the active objects, and a state of the active objects, wherein the state of the active objects are dynamically updated based on the values associated with the one or more predefined qualifiers and the one or more predefined consequences;

interpolating the extracted plurality of pre-stored images and the plurality of pre-stored videos based on the mapped one or more predefined user actions in real-time to generate a video sequence, wherein the interpolating further comprises a selection of at least one of the plurality of pre-stored images with at least one of the plurality of pre-stored videos to generate at least a portion of the video sequence; and displaying the video sequence to the user, thereby providing interaction with the virtual product.

* * * * *